Nov. 6, 1951     R. LEDUC     2,574,335
FLUID PRESSURE MOTOR DEVICE FOR CONTROL SYSTEMS
Filed Feb. 21, 1948     2 SHEETS—SHEET 1
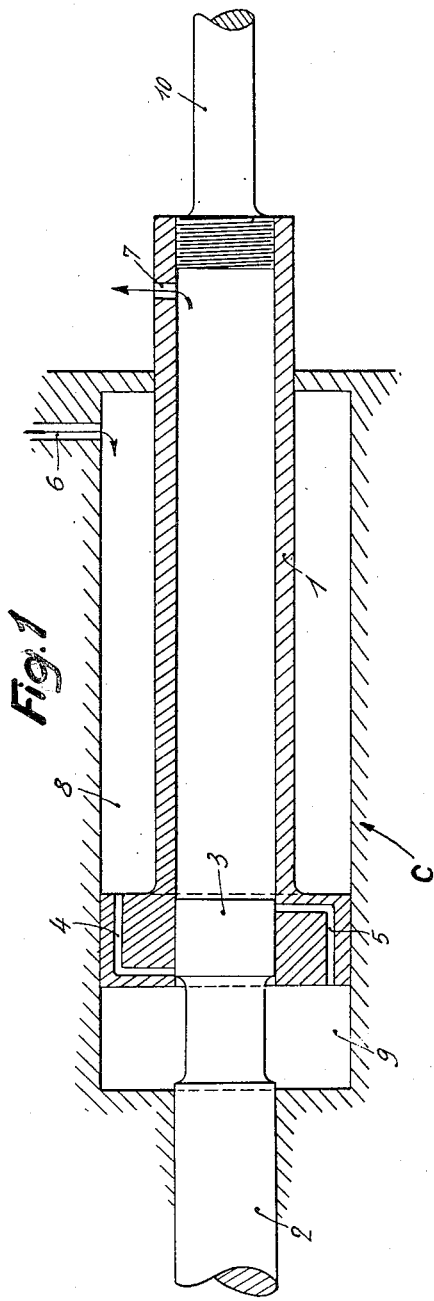
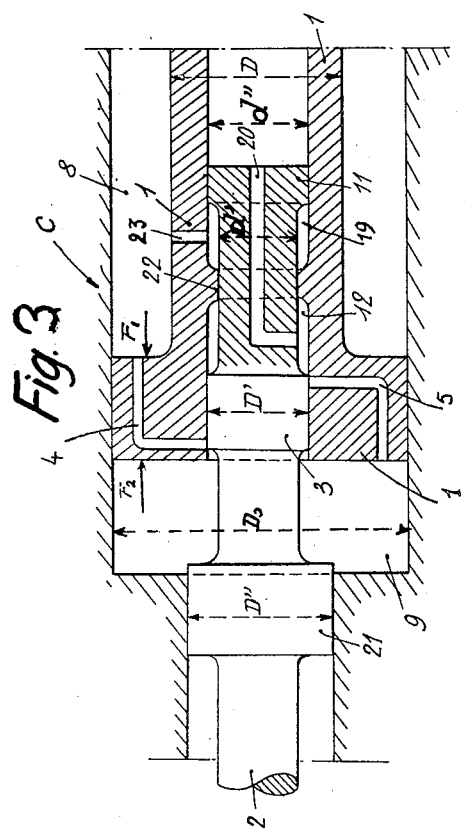
Inventor:
René Leduc Nov. 6, 1951  R. LEDUC  2,574,335
FLUID PRESSURE MOTOR DEVICE FOR CONTROL SYSTEMS
Filed Feb. 21, 1948  2 SHEETS—SHEET 2

Patented Nov. 6, 1951

2,574,335

UNITED STATES PATENT OFFICE 2,574,335

FLUID-PRESSURE MOTOR DEVICE FOR CONTROL SYSTEMS

René Leduc, Toulouse, France

Application February 21, 1948, Serial No. 10,060

4 Claims. (Cl. 121—41)

This invention relates to control systems especially for aircraft, and is concerned with improvements in power-operated or servo-control devices using hydraulic or pneumatic power.

More particularly, it relates to the type of control system in which a power-operated motor device is introduced into a control circuit between a controlling element, such as a manually operated lever, and a controlled element, such as a control surface of an aircraft, the circuit being thus subdivided into two parts, which are respectively manually-operated and power-operated, and the system being such as to maintain positional correspondence between the controlling and the controlled elements.

An object of this invention is to provide a system, which in its simplest form is a power-operated system, but which in a more developed form constitutes a servo-system, a definite fraction of the force exerted by the power device on the controlled element being fed back to the controlling element, providing a resistance to be overcome by the operator or pilot, which is proportional to but smaller than the resistance imposed by the controlled element. In the power device of this invention the motive power is furnished by fluid under pressure, i. e. pneumatic or hydraulic power is used.

The objects of this invention include the provision of a power-operated or servo-control motor device, giving continuous positional correspondence between a controlled member and a power-operated or servo-operated controlled member, comprises a stationary cylinder, in which slides a power- or servo-piston rigidly secured to the controlled member and positively displaced in either sense by a fluid under pressure, and in which are formed inlet and exhaust passages terminating in ports opened and closed by the controlling member, in such a way that the power- or servo-piston follows the displacements of the controlling member.

A further object of the invention is the provision of a motor device of the servo-type in which a fraction of the effort exerted by the fluid in the servo-piston is fed back to the controlling member by means of two opposed auxiliary surfaces formed integrally with the controlling member and subjected respectively to the pressures experienced by one and the other of the opposed faces of the servo-piston.

The objects of the invention also include the application of one or more power- or servo-motor devices to a control circuit connecting a controlling element, e. g. a manually operated lever, with a controlled element, e. g. a control surface of an aircraft, and comprising a remotely operating transmission of the push-pull type, the transmission being subdivided into two or more sections serially connected by power-operated or servo-control devices of the kind described above, so that power is fed into the circuit in stages, the power fed in at each stage being at least sufficient to make good the frictional losses.

The accompanying drawings illustrate examples of power- or servo-devices according to the invention, and an example of a control system embodying such devices.

In the drawings:

Figure 1 is a schematic view in axial section of a fluid motor device for a power-operated control system, in its simplest form.

Figure 3 is a partial view in axial section of a motor device for a servo-control system, elaborated from the device of Figure 1.

Figure 4:
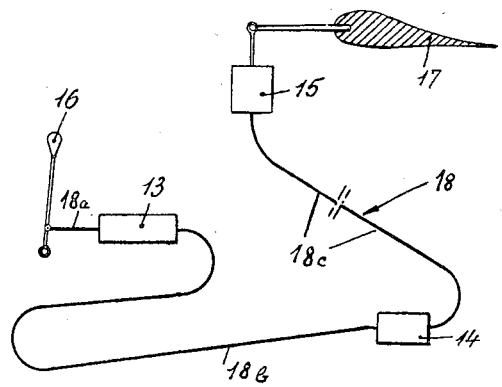
Figure 4 is a diagrammatic representation of a control system including power- or servo-devices disposed in series along the control circuit.

Referring to Figure 1, the device comprises a cylinder C in which slides a power-piston 1 which is centrally bored to receive a piston 3 formed on the end of a coaxial rod 2 which slides in the head of the cylinder C. In the head of piston 1 are formed passages 4 and 5 which open respectively into spaces 8 and 9 to the right and left of the piston, as seen in Figure 1; and both terminate at ports in the central bore of the piston in the manner shown in Figure 1. Fluid under pressure is admitted to the cylinder space 8 by means of an inlet 6, and the fluid is exhausted from the interior of piston 1 by means of an opening 7 in the piston rod outside the cylinder. The rod 2 constitutes the controlling element of the device and to the rod of piston 1 is secured a rod 10 constituting the controlled element which is power-operated by the motor device. The piston 3 may conveniently be referred to as a control piston.

Movement of the rod 2 to the right, as seen in Figure 1, causes the control pistons 3 to uncover the terminal port of passage 4 in the bore of piston 1, thus placing the space 9 in communication with the space 8. The fluid pressures in spaces 8 and 9 are, therefore, equalised at the supply pressure, applied by way of the inlet 6, and since the effective area of the left-hand face is greater than that of the right-hand face of the piston 1, the latter is moved to the right (as seen in Figure 1), while fluid under pressure flows from inlet 6 through space 8 and passage 4 into space 9. This continues until the movement of the piston 1 causes the terminal port of passage 4 to be again closed by the piston 3 when all movement ceases. Conversely, movement to the left of rod 2 causes the piston 3 to uncover the terminal port of passage 5 in the bore of piston 1, thus putting the space 9 into communication with the interior of piston 1, which communicates with the exhaust by way of opening 7. Consequently, the left-hand face of piston 1 is under exhaust pressure, while the right-hand face is still under the supply pressure. Piston 1 therefore moves to the left, fluid under pressure entering space 8 through inlet 6, and fluid expelled from space 9 through passage 5 being exhausted through opening 7, until the movement of piston 1 causes the terminal port of passage 5 to be again closed by piston 3, thus rendering space 9 completely enclosed. Leftward movement of piston 1 ceases when the back pressure in space 9 is equal to the supply pressure. If hydraulic power is used, the motive fluid being a liquid, which is almost incompressible, the further movement of piston 1 after closure of passage 5 is negligible; but if pneumatic power is employed, the further movement of piston 4 necessary to compress the air in space 9 up to the supply pressure will be appreciable.

It will be seen from the above that the displacement of the rod 2 and piston 3 in either direction gives rise to a substantially equal displacement of the power-piston 1 and rod 10 in the same direction under the action of the motive fluid, so that the power piston 1 follows the movement of the control piston 3 and substantially exact positional correspondence between the controlling element 2 and the controlled element 10 is maintained throughout the full stroke of the pistons.

The diameters of rod 2 and piston 3 are equal, and since the right-hand face of pitson 3 is always under exhaust pressure, which may be taken as negligible compared with the supply pressure, the rock 2 and piston 3 are at all times in equilibrium with respect to the applied fluid pressures. Consequently, the effort exerted by the motive fluid on piston 1, for displacement in either direction, is completely independent of the effort exerted on the controlling element 2 which is dictated solely by the friction to be overcome. This device is, therefore, a power-operated motor device rather than a servo-motor device, and the force exerted by the motive fluid on the controlled element is limited only by the areas of the piston 1 and the working pressure of the fluid.

Figure 2:
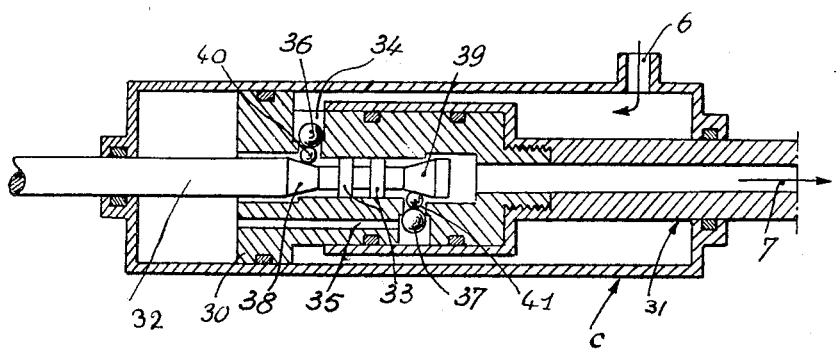
Figure 2 is a view in axial section of a device similar in principle to that of Figure 1 and incorporating valves of a preferred type.

The modified form of this device shown in Figure 2 comprises, as before, a cylinder C in which slides a power-piston 30 and attached hollow piston rod 31. As before, the pressure-fluid inlet 6 to the cylinder is to right of piston 30 as seen in the drawing, and exhaust takes place through the interior 7 of the piston rod 31. The controlling element consists of a rod 32 sliding in the head of the cylinder C and entering the central bore of piston 30, between which and the rod 32 a clearance is established, the rod 32 being provided with lands 33 which slide in the bore of the piston 30 and separate the clearance into two parts. Passages 34 and 35 formed in the piston 30 and corresponding to the passages 4 and 5 of Figure 1 terminate at ports in the bore of the piston 30 which form the seatings for ball valves 36, 37. The rod 32 is provided with two facing tapers 38, 39, which respectively act through intermediate balls 40, 41 to lift the balls 36, 37, from their seatings, when the rod 32 is moved to the right and to the left respectively with reference to the piston 30.

It will be seen that the ball 36 is held on its seating by the supply pressure, except when lifted by the taper 38, in which position of the parts the ball 37 is not lifted by the taper 39 and is held on its seating by the supply pressure acting through the passage 35.

This form of the device operates in exactly the same manner as that of Figure 1.

Figure 3 shows a modification of the arrangement of Figure 1 in which provision is made for feeding back a definite fraction of the effort exerted on the power-piston 1 by the motive fluid on to the controlling element 2, which is therefore provided with a second piston 21 sliding in the head of the cylinder C and an extension carrying a third piston 11 which slides in the bore of the rod of piston 1. The diameter of piston 21 is greater than that of piston 3 and the extension carrying piston 11 is of reduced diameter and slides on an internal land 22 of the piston 1 separating the clearance between the extension of rod 2 and the bore of piston 1 into two parts 12 and 19 respectively, of which the former communicates with the interior of the rod of piston 1 by means of a passage 20 formed in the extension of rod 2 and in the piston 11 and the latter communicates with space 8 through an opening 23 drilled in the rod of piston 1. Consequently, the clearance space 12 is always at exhaust pressure and the clearance space 19 is always at supply pressure. The diameter of piston 21 is $D''$ and that of piston 3 is $D'$; and the diameters of the extension of rod 2 carrying piston 11 and of the piston 11 itself are respectively $d'd''$, while the diameter of the power-piston 1 and the external diameter of its rod are respectively $D_0$ and $D$.

In order that the same fraction of the effort applied by the motive fluid to the power-piston 1 may be fed back to the controlling element 2 for motion in either direction, the effective area of pistons 21 and 3 exposed to the fluid pressure in space 9 must bear the same ratio to the effective area of piston 1 exposed to this pressure as the effective area of piston 11 exposed to the fluid pressure in clearance space 19 bears to the effective area of piston 1 exposed to the pressure in space 8 plus the effective area of the land 22 exposed to the pressure in clearance space 19, the latter pressure being equal to that in space 8; provided the exhaust back pressure on the end face of piston 11 and in clearance space 12 is negligible compared with the working pressure in spaces 8 and 19.

If the above-mentioned ratio is equal to K, the foregoing requirement may be expressed in terms of the diameters of the pistons and of the extension of rod 2 by the following equations:

$$\frac{D''^2 - D'^2}{D_0^2 - D'^2} = \frac{d''^2 - d'^2}{D_0^2 - D^2 + d''^2 - d'^2} = K$$

The coefficient defining the fraction fed back to the rod 2 of the total effort exerted by the motive fluid on the piston 1 is K, so that if $F_1$ and $F_2$ are the forces exerted by the fluid on the right and left-hand faces of the piston 1, the force fed back to the rod 2 is $K(F_2 - F_1)$.

The foregoing equations define the necessary relationship between the various diameters required to ensure that the fraction of effort fed back to the rod 2 is the same for motion in both directions. If it is desired that the effort exerted by the motive fluid on the piston 1, viz. the difference of $F_2$ and $F_1$, is the same for motion in both directions, the following further relation must also be satisfied:

$$2(D^2 + d'^2 - d''^2) = D_0^2 + D'^2$$

The arrangement of Figure 3 constitutes a servomotor as above defined, and such an arrangement is frequently desirable, especially in the case of aircraft control systems, in order to provide the pilot with "feel" on his controls.

Figure 4 illustrates diagrammatically a complete control system comprising a manual control lever 16, a controlled member 17, shown in the form of an aircraft control surface, and a connecting circuit 18, which may be of the type employing flexible push-pull elements operating in tubes and known as Bowden wire devices. The circuit 18 is subdivided into sections 18a, 18b and 18c, each of which is a Bowden wire device, serially connected by power- or servo-motor devices 13, 14 of the type illustrated and described with respect to any of Figures 1, 2, and 3, the final section 18c being connected to the controlled element 17 by means of a further power- or servo-motor device 15 of the same kind. The power- or servo-motor devices 13, 14 and 15 each include rods, such as rod 2 shown in Figs. 1 and 3 or rod 32 shown in Fig. 4, which are respectively connected to sections 18a, 18b, and 18c; and these devices 13, 14 and 15 also include piston rods, such as elements 1, 10 of Figs. 1 and 3 or 31 of Fig. 2, which are respectively connected to sections 18b, 18c, and the controlled element 17. In this arrangement, the control element 17 is directly operated by the power- or servo-motor 15, the other two power- or servo-motors 13, 14 merely having the function of making good the frictional losses in the control circuit.

I claim:

1. A fluid-pressure motor device for incorporation in a control system, comprising a stationary cylinder, a power-piston movable therein and having a piston rod extending through one end of the cylinder for connection to a controlled member, the piston and rod being centrally bored, an outlet in the piston rod outside the cylinder for exhausting fluid from its interior, an inlet in the cylinder on the same side of the power-piston as the piston rod for admission of fluid into the cylinder, two fluid-transfer passages in the power-piston communicating respectively with each face thereof and both terminating at ports in central bore of the piston, the relative positions, in the axial direction of the piston, of these ports being the opposite of those of the openings of their associated transfer passages on the faces of the piston, a controlling rod sliding in the end of the cylinder remote from the power-piston rod and entering the bore of the power-piston, said controlling rod carrying a piston element sliding in the bore of the power-piston for selectively opening one and the other of the said ports to provide communication respectively between the two faces of the power-piston and between the face thereof remote from the fluid inlet and the interior of the power-piston rod, according as the controlling rod is moved relatively to the power-piston towards or away from the end of the cylinder through which the power-piston rod extends, and carrying auxiliary surfaces subjected to the fluid pressure on either side of the power-piston and present differential areas to such fluid-pressure, such that a fraction of the force exerted by the fluid-pressure on either face of power-piston is fed back to the controlling rod, which thus experiences resistance proportional to the effort exerted on the controlled member by the power-piston rod.

2. A fluid-pressure motor device as claimed in claim 1, in which the controlling rod carries a second piston-element sliding in the end of the cylinder remote from the fluid inlet and of greater diameter than the first-mentioned piston-element, the controlling rod also having an extention beyond the first-mentioned piston-element terminating in a third piston-element sliding in the bore of the power-piston rod, the extension itself being of reduced diameter and the bore of the power-piston rod having an internal constriction in which the extension slides and which divides the clearance round the extension into two parts, of which the one next the third piston-element communicates with the cylinder space surrounding the power-piston rod by means of an opening in the latter, and the other communicates with the interior of the power-piston rod by means of a passage formed in the extension of the controlling rod and the third piston-element; whereby a fraction of the force exerted by the fluid-pressure on the power-piston, for motion in either direction, is fed back to the controlling rod in the appropriate direction for the latter to experience a resistance to motion proportional to the effort exerted by the power-piston rod on the controlled member.

3. A fluid-pressure motor device as claimed in claim 2, in which the external diameter of the power-piston is greater than the external diameter of the power-piston rod, and the external diameter power-piston rod is greater than the external diameter of the second-mentioned piston-element of the controlling rod, said external diameter of the second-mentioned piston-element of the controlling rod being greater than the external diameters of the first and third-mentioned piston-elements of the controlling rod, and the external diameters of said first and third-mentioned piston-elements of the controlling rod being greater than the internal diameter of the internal constriction of the power-piston rod.

4. A fluid-pressure motor device for incorporation in a control system, comprising a stationary cylinder, a power-piston movable therein and having a piston rod extending through one end of the cylinder for connection to a controlled member, the piston and rod being centrally bored, an outlet in the piston rod outside the cylinder for exhausting fluid from its interior, an inlet in the cylinder on the same side of the power-piston as the piston rod for admission of fluid into the cylinder, two fluid-transfer passages in the power-piston communicating respectively with each face thereof and both terminating at ports in central bore of the piston, the relative positions, in the axial direction of the piston, of these ports being the opposite of these of the openings of their associated transfer passages on the faces of the piston, a controlling rod sliding in the end of the cylinder remote from the power piston rod and entering the bore of the power-piston, means carried by the controlling rod and including a piston element sliding in the bore of the power-piston for selectively opening one and the other of the said ports to provide communication respectively between the two faces of the power-piston and between the face thereof remote from the fluid inlet and the interior of the power-piston rod, according as the controlling rod is moved relatively to the power-piston towards or away from the end of the cylinder through which the power-piston rod extends, a second piston element carried by the controlling rod sliding in the end of the cylinder remote from the fluid inlet and of greater diameter than the first mentioned piston element, the controlling rod also having an extension beyond the first mentioned piston element terminating in a third piston element sliding in the bore of the power-piston rod, the extension itself being of reduced diameter and the bore of the power-piston rod having an internal construction in which the extension slides and which divides the clearance round the extension into two parts, of which the one next to the third piston element communicates with the cylinder space surrounding the power-piston rod by means of an opening in the latter, and the other communicates with the interior of the power-piston rod by means of a passage formed in the extension of the controlling rod and the third piston element, whereby a fraction of the force exerted by the fluid-pressure on the power-piston, for motion in either direction, is fed back to the controlling rod in the appropriate direction for the latter to experience a resistance to motion proportional to the effort exerted by the power-piston rod on the controlled member.

RENÉ LEDUC.

REFERENCES CITED

The following references are of record in the file of this patent:

UNITED STATES PATENTS

| Number | Name | Date |
| --- | --- | --- |
| 773,365 | Atkins | Oct. 25, 1904 |
| 2,393,585 | Boynton | Jan. 29, 1946 |
| 2,449,400 | Lindsey | Sept. 14, 1948 |
| 2,472,547 | Purcell | June 7, 1949 |

FOREIGN PATENTS

| Number | Country | Date |
| --- | --- | --- |
| 344,037 | Great Britain | Aug. 28, 1930 |
| 549,300 | Great Britain | Oct. 29, 1941 |